F. H. CROCKARD.
BLAST FURNACE CHARGING APPARATUS.
APPLICATION FILED FEB. 6, 1909.

938,411.

Patented Oct. 26, 1909.
7 SHEETS—SHEET 3.

F. H. CROCKARD.
BLAST FURNACE CHARGING APPARATUS.
APPLICATION FILED FEB. 6, 1909.
938,411.
Patented Oct. 26, 1909.
7 SHEETS—SHEET 7.
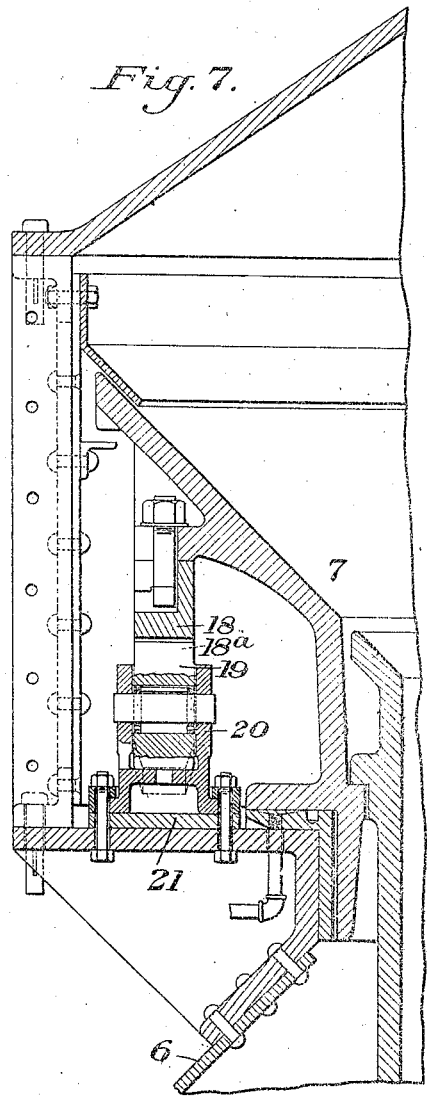
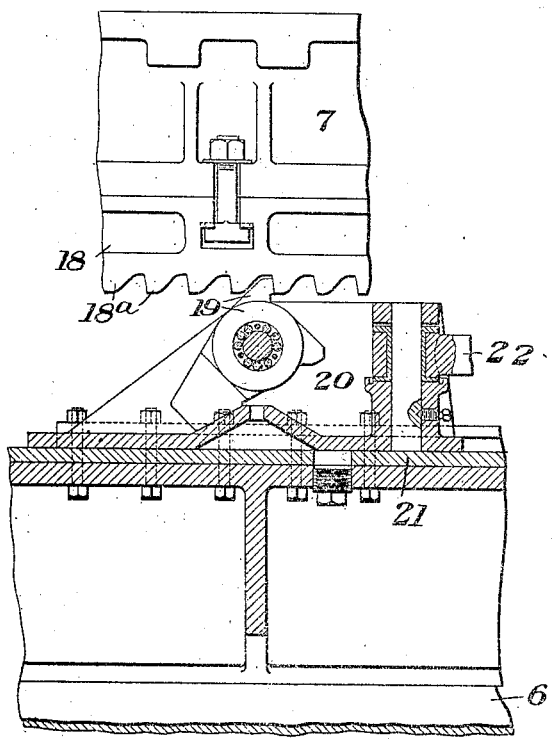
WITNESSES
INVENTOR

UNITED STATES PATENT OFFICE.

FRANK H. CROCKARD, OF BIRMINGHAM, ALABAMA.

BLAST-FURNACE-CHARGING APPARATUS.

938,411.

Specification of Letters Patent. Patented Oct. 26, 1909.

Application filed February 6, 1909. Serial No. 476,490.

*To all whom it may concern:*

Be it known that I, FRANK H. CROCKARD, of Birmingham, Jefferson county, Alabama, have invented a new and useful Blast-Furnace-Charging Apparatus, of which the following is a full, clear, and exact description, reference being had to the accompanying drawings, forming part of this specification, in which—

Figure 1:
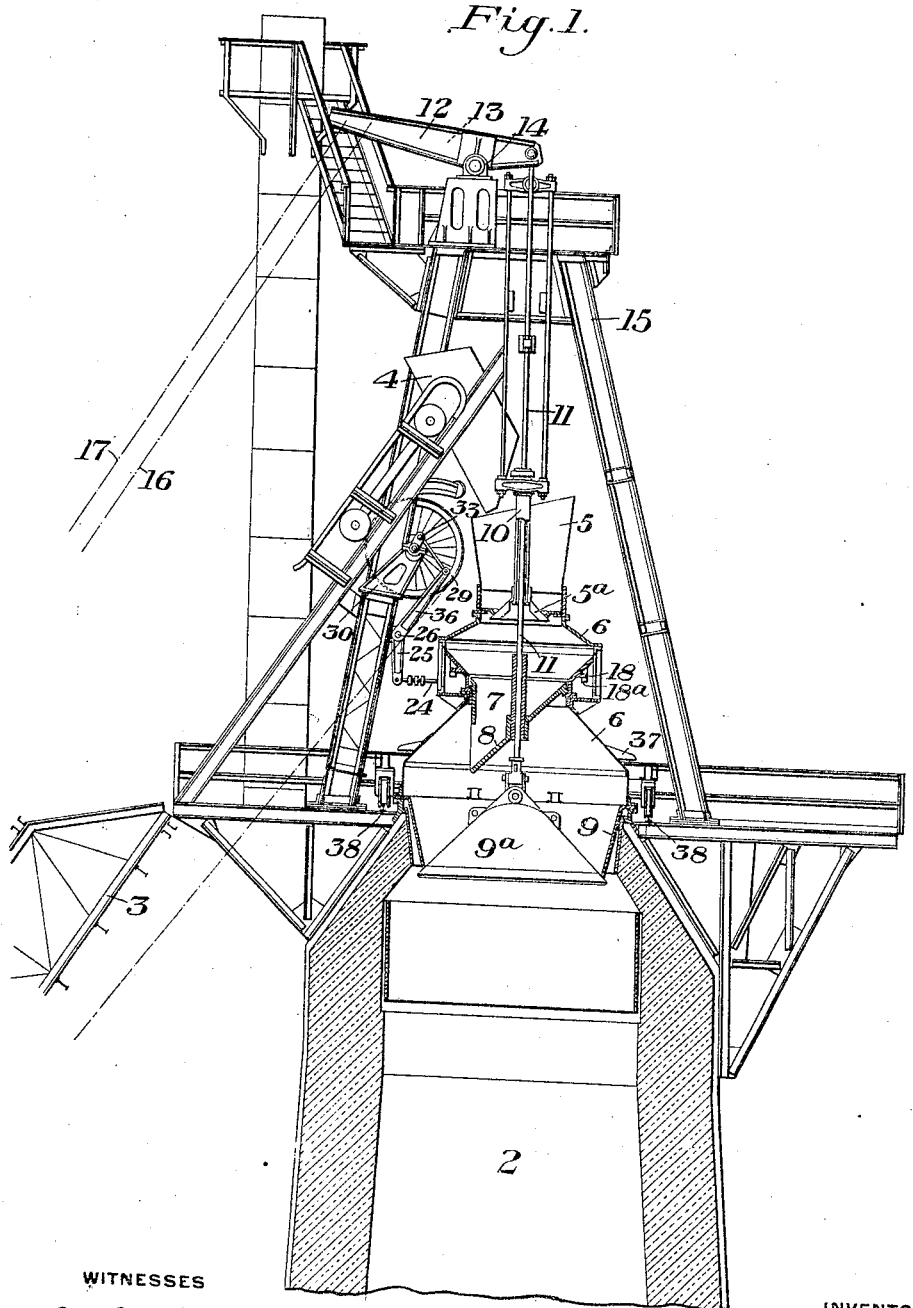
Figure 2:
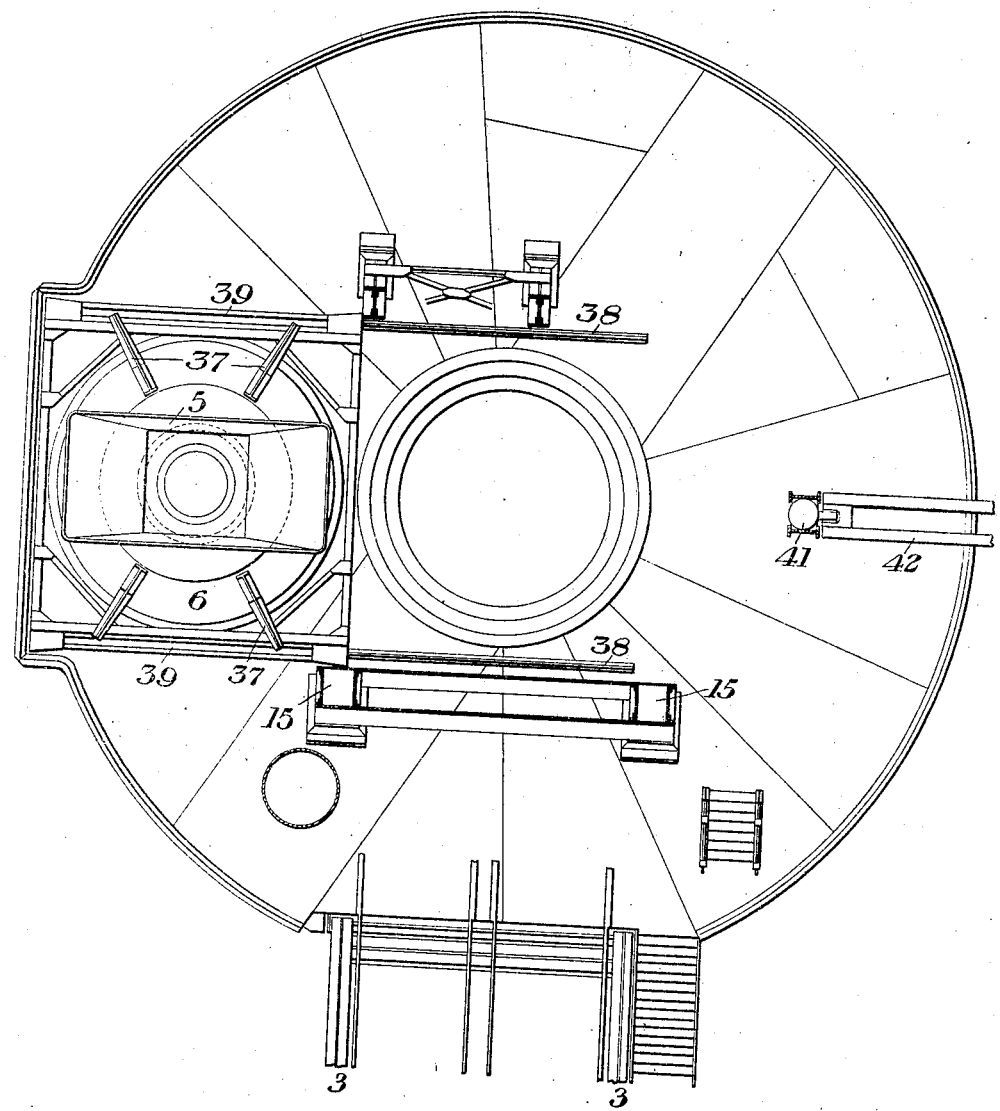
Figure 3:
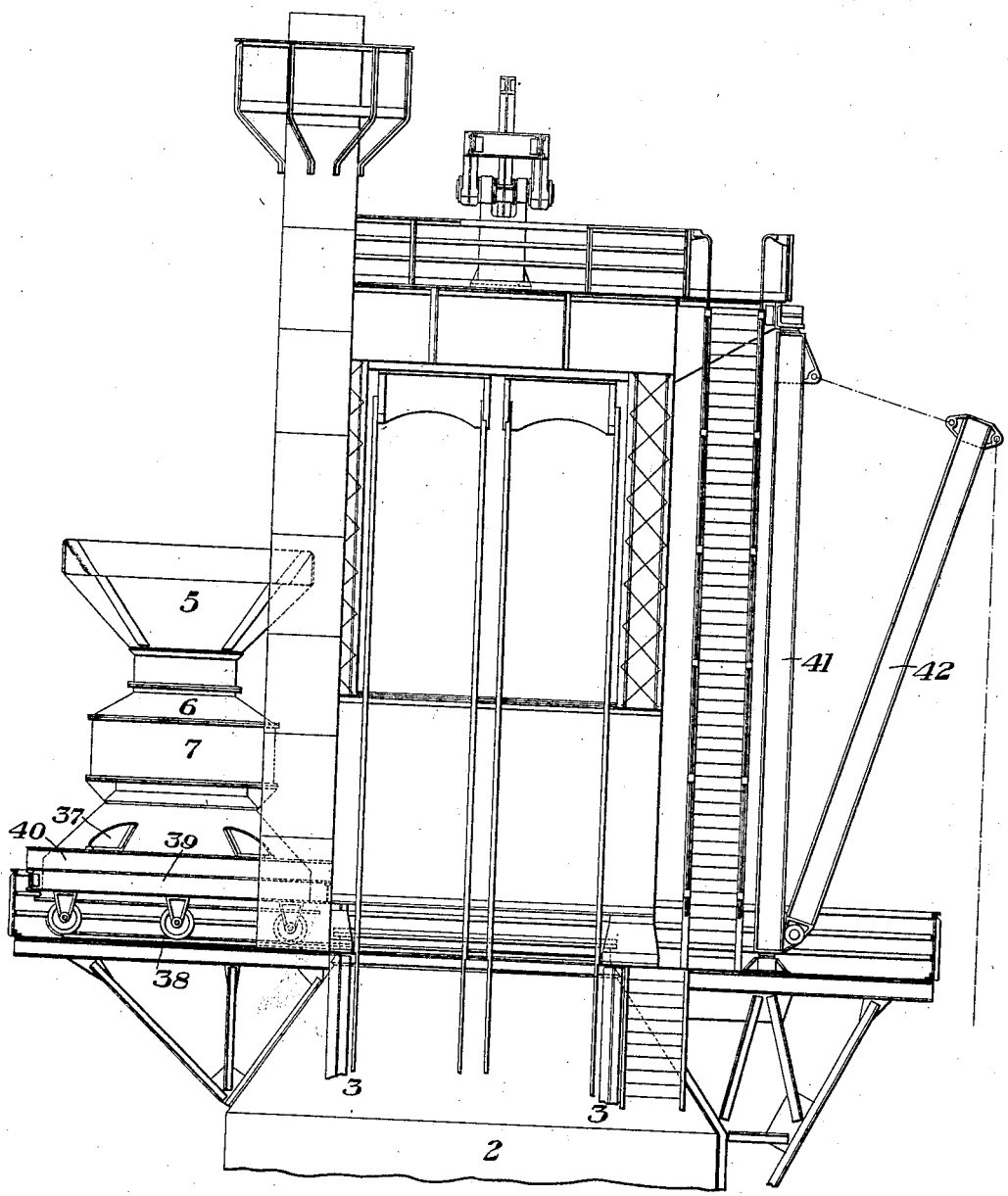
Figure 4:
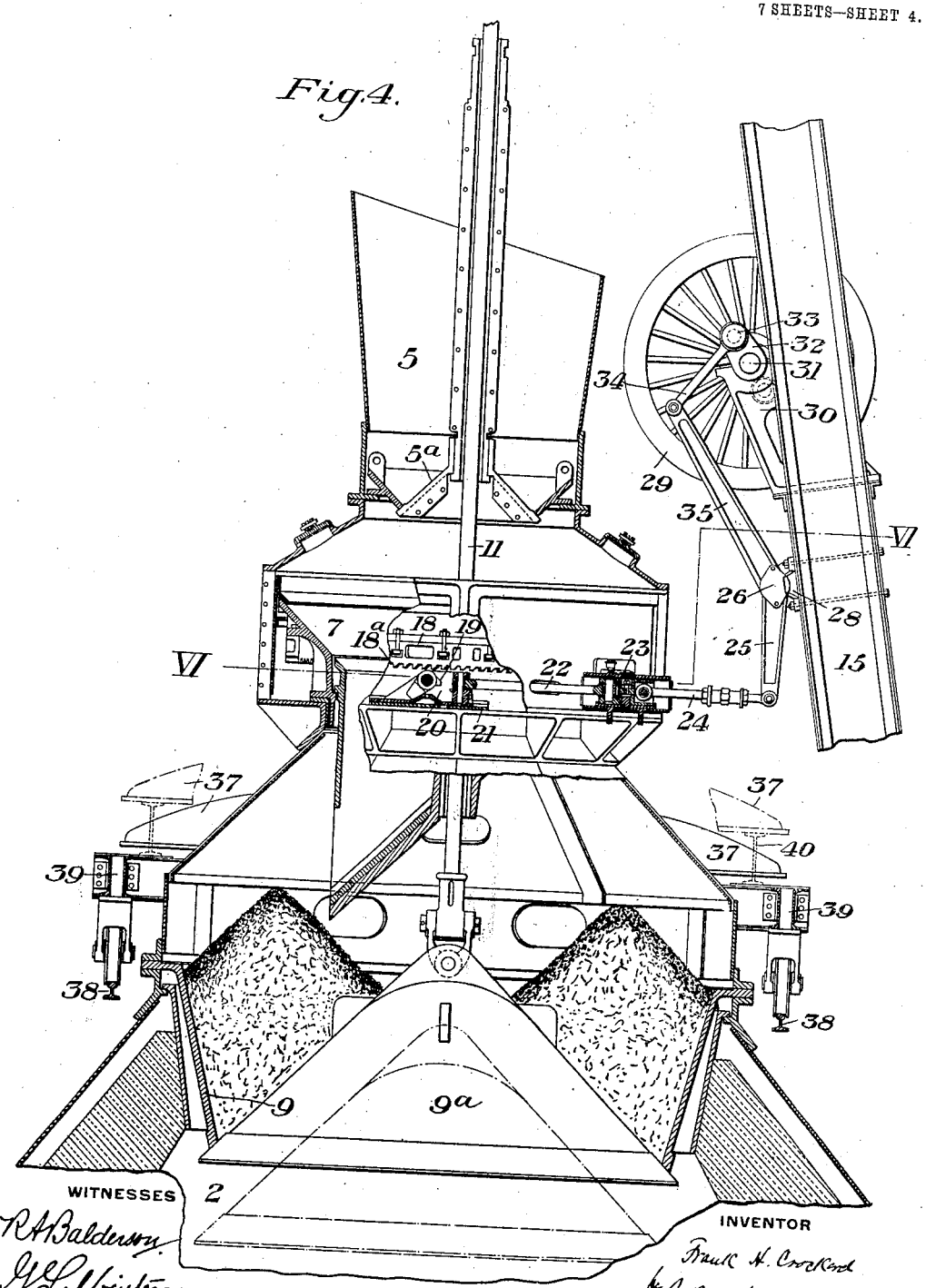
Figure 5:
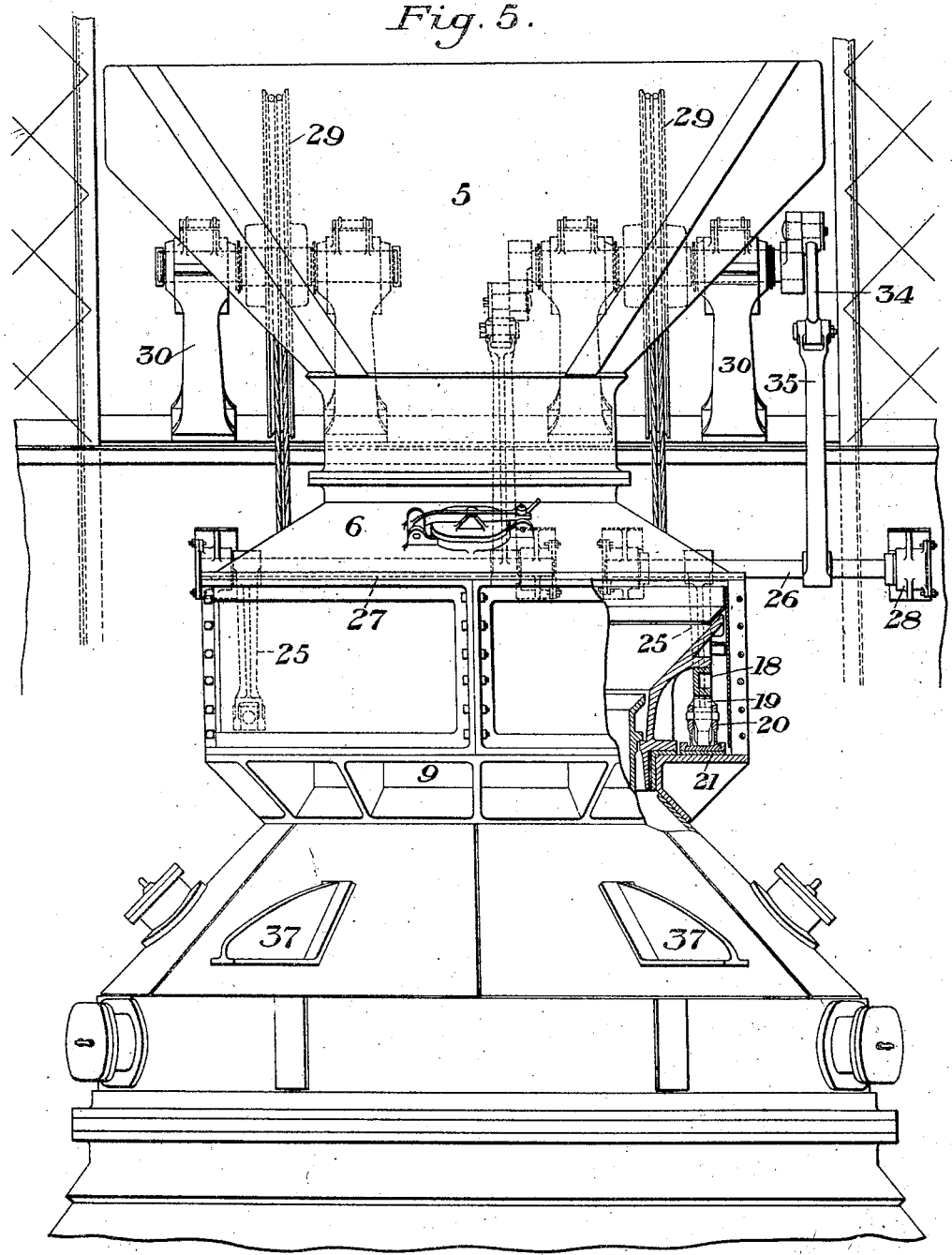
Figure 6:
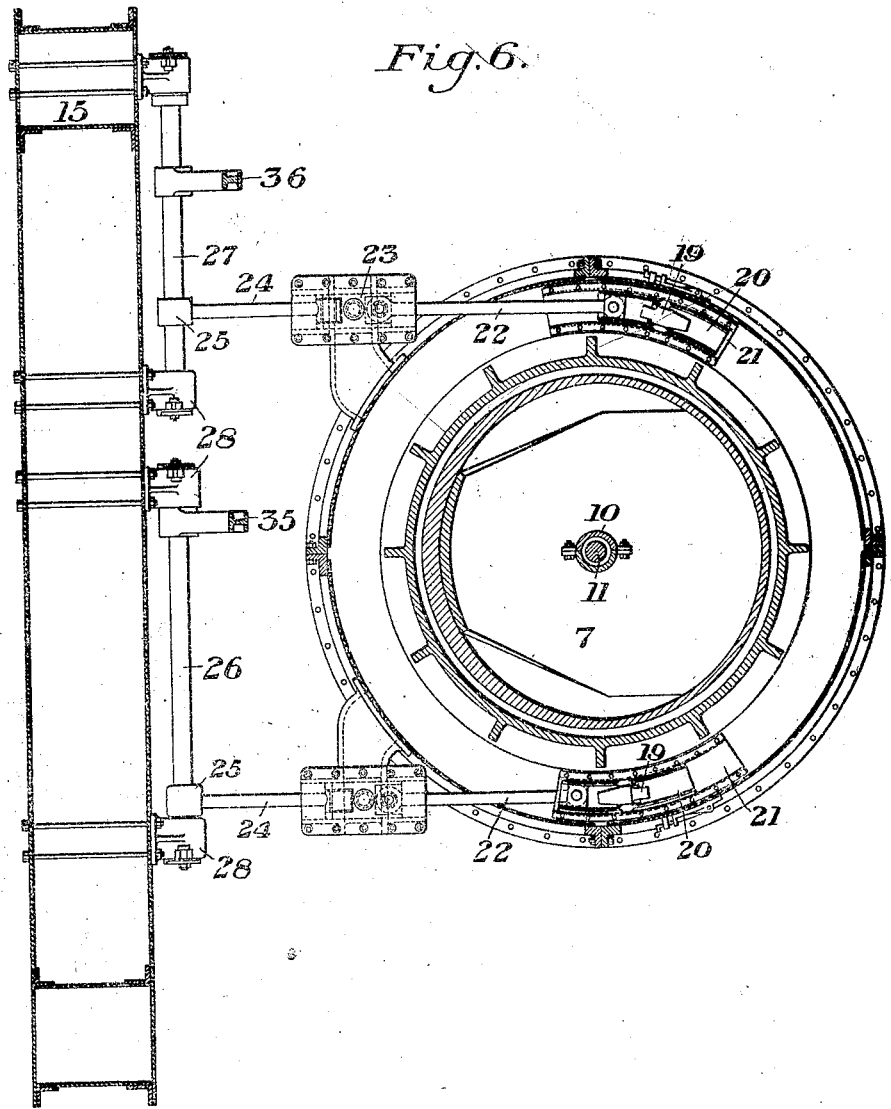

Figure 1 is a sectional side elevation of the top of a blast furnace equipped with apparatus constructed and arranged in accordance with my invention; Fig. 2 is a plan of the furnace top shown in Fig. 1; Fig. 3 is a side elevation of the same showing the top charging hopper and gas sealing hood, together with the rotary distributing hopper which is mounted temporarily on the wheeled truck upon which they are carried and are shifted laterally upon the top platform of the furnace; Fig. 4 is a side elevation of the furnace top partly in section showing the construction and arrangement of the rotary distributing hopper; Fig. 5 is a broken sectional elevation of the furnace top showing the construction of the turning mechanism for the rotary distributing hopper; Fig. 6 is a sectional plan taken on the line VI—VI of Fig. 4 showing the ratchet turning mechanism forming part of the hopper turning apparatus; Figs. 7 and 8 are sectional elevations on a larger scale showing the construction of the toothed rack and the tilting ratchet pawls forming part of my invention.

My invention relates to the construction and arrangement of the top gear used with modern closed top mechanically charged blast furnaces and it more particularly relates to the mechanism employed in distributing materials charged into such furnaces and in improved means by which the distributing mechanism is actuated.

The invention further relates to improved apparatus employed in handling charging mechanism on the top of such furnaces when making changes and repairs on the top of the furnaces.

The invention is designed to provide improved distributing mechanism by which after being hoisted to the top of the furnace, the coarse and fine materials forming the charges of stock are oriented and are uniformly distributed about the vertical axis of the furnace preparatory to being introduced into the furnace shaft.

The invention is also designed to provide improved means by which the rotary distributing hopper forming part of the apparatus is actuated.

The invention is still further designed to provide novel means for handling the top gear of the furnace by which the time necessary in making changes and repairs is lessened and the cost of such repairs is greatly reduced.

In the drawings, 2 represents the blast furnace and 3 the inclined track leading to the top of the furnace upon which the skip cars 4 travel in carrying the materials charged into the furnace top. The skip cars are arranged to deposit their contents in the top hopper 5 mounted on the top of the gas sealing hood 6 which covers the mouth of the furnace 2. On the interior of and carried by the gas sealing hood 6 is a rotary hopper 7 having a sloping bottom 8 and a side opening outlet through which the materials are discharged into the lower hopper 9 located in the mouth of the furnace shaft below the hoppers 5 and 7. The hoppers 5 and 9 are provided with closing bells 5ª and 9ª which are suspended by means of the bell rods 10 and 11 from one end of the bell beams 12 and 13. These bell beams are pivotally mounted on bearings 14 carried on top of the frame work 15 and one end of each of the bell beams is connected by cables or other flexible connections 16 and 17 with the bell operating motors, not shown.

The distributing hopper 7 is provided with a circular segmental rack 18 having ratchet teeth 18ª on its lower or bottom surface, which are arranged to engage with the tilting ratchet pawls 19 by which the hopper 7 is rotated. The pawls 19 are mounted in reciprocating cross heads 20 which are arranged to slide on the curved track 21 forming a part of the upper portion of the gas sealing hood 6. The cross heads 21 travel in a curved path and are connected by the links or rods 22 with reciprocating cross heads 23. The cross heads 23 are connected by adjustable links or rods 24 with the lever arms 25 which are mounted on the rocking shafts 26 and 27, these shafts being mounted in bearings 28 which are secured to the frame work 15 forming part of the top of the furnace.

The skip cars 4 are connected to one end of hoisting ropes or cables by which they are lifted to the furnace top, these ropes passing over pulleys or sheave wheels 29 in the usual manner and having one of their ends connected to the hoisting motor in the usual manner. The sheave wheels 29 are mounted in bearings 30 which are supported on the frame work 15 and the shaft 31 for one of the sheave wheels is provided on its ends with cranks 32 having crank pins 33 to which one end of the links 34 are connected. The opposite ends of the links are secured to the outer end of the levers 35 and 36 which are employed to rock the shafts 26 and 27 when the wheel 29 is rotated in raising and lowering the skip cars to and from the top of the furnace. It will be noted that the cross-heads 21 will actuate the distributing hopper 7 in one direction continuously while the wheel 29 is rotated in either direction.

The gas sealing hood 6 is provided with brackets 37 and on the top of the furnace platform are track rails 38 forming the track on which the wheeled truck 39 is mounted, the track rails 38 extending across the top of the platform as shown in Fig. 2. The framework of this truck surrounds the gas sealing hood 6 when the furnace is in operation and is arranged to support the gas seal 6, and the mechanism supported on and above the gas seal, while making changes in the furnace top. When making such changes, the gas seal 6 is disconnected from the hopper 5 and is raised vertically from the hopper 9 to such height that the beams 40 can be inserted in place between the underside of the brackets 37 and the top of the truck 39 as shown in dotted lines in Fig. 4, by this operation the gas sealing hood 6 and mechanism above the gas seal being supported upon the truck 39. The swinging jib crane 41 having an adjustable boom 42 is provided on the furnace top for the purpose of raising the bells, hoppers and other apparatus employed on the top of the furnace from the ground in erecting and repairing the furnace.

In the operation of my improved charging apparatus, the materials forming the burden charged into the furnace are lifted to the furnace top in the skip cars 4 on the track 3 in the usual manner. The materials are discharged from the skip cars 4 into the hopper 5 which is normally held closed by the upper or gas sealing bell 5ª. The bell 5ª is then lowered by means of the bell rope 11 and its operating mechanism, and materials in the hopper 5 are discharged into the rotary distributer 7. The materials entering the rotary distributer 7 are discharged down its inclined bottom 8 and through the side outlet opening into the lower hopper 9, the charge being deposited on one side of the center of the hopper 9. Another skip car is then raised to the top of the furnace and the above described operation is repeated. When the skip car 4 is being raised to the top of the furnace, the cable or rope passing over the sheave wheel 29 causes this wheel to rotate together with its shaft 31 and the cranks 32 on the end of this shaft. When the cranks 32 are rotated, the rods 34 move the lever arms 36 and 35 on the shaft 26 and through the connecting rod 24, the cross head 23 and connecting rod 22, actuate the cross head 21 having the tilting pawl 19 mounted thereon. When the pawl 19 is moved in one direction, it engages with the teeth 18ª on the rack 18 and turns the rotary distributing hopper 7 throughout a part of a revolution, bringing the side outlet opening on this hopper 7 into a discharging position which is at an angle to its last discharging position. In this way the successive charges of materials are deposited in the hopper 9 at an angle axially to the last deposited charge and in this way the successive charges of materials are oriented and the coarse and fine materials forming each charge are uniformly distributed about the vertical axis of the furnace. The above described operations are repeated as often as is necessary to keep the furnace charged with its burden and the materials are automatically distributed by means of the hoisting mechanism. This is of practical advantage as by its use the distribution does not depend upon the operator performing the duties to insure the materials being distributed.

When for any reason it becomes necessary to remove or replace the bells or hoppers it has heretofore been the practice to dismantle the sealing hood, the top hopper and other apparatus forming the top rigging of the furnace. This operation results in long delays in the working of the furnace. By means of my improved mechanism, I first disconnect the gas sealing hood 6 and then lift this hood together with the mechanism supported and above it, until the brackets 37 rest on the beams 40, which are placed between the brackets and the top of the truck 39. The bell 9ª is then disconnected from its bell rod, being temporarily secured by other means to prevent its being dropped into the furnace. The truck 39 with the apparatus, temporarily mounted upon it is then shifted laterally on its track rails until it is in the position shown in Fig. 2. By this operation the top rigging is shifted sidewise so as to be clear of the mouth of the furnace shaft which permits of changes or repairs being readily made to the furnace mouth.

Bells and hoppers or other mechanism are raised to the top of the furnace by means of the adjustable jib crane 41 and suitable tackle, the adjustable jib 42 of this crane being swung vertically to move the bell into position above the furnace platform, where it is deposited by the tackle. The bells and hoppers are taken from this point and are put into position in the furnace. When the truck with its load is again brought to the center of the furnace, the beams 40 are removed and the gas seal 6 with the mechanism supported by it, is again lowered into position and is securely bolted in place. The bell-ropes are then connected to the bells when the furnace is again ready to be put in operation.

The advantages of my invention will be apparent to those skilled in the art. By means of my improved distributing mechanism, the materials are uniformly and equally distributed in the hopper from which they are deposited in distributed condition into the top of the furnace. The distributing hopper is automatically rotated step by step by the successive lifting operations of the skip cars. The rotating mechanism for the hopper is simple and is easily kept in repair. The wheeled truck used in supporting and transferring the top mechanism into and out of position from the top of the furnace, facilitates the making of changes and repairs in the furnace and lessens the time lost in the operation of the furnace.

Various changes may be made in the construction and arrangements of the parts without departing from my invention.

What I claim is:—

1. Blast furnace charging apparatus, comprising stock-hoisting mechanism having a rotating hoisting rope sheave wheel, a crank upon the sheave wheel shaft, a rotary stock-distributing hopper, means for rotating the hopper, and mechanism connected to said crank for actuating the hopper-rotating means and arranged to rotate the hopper in one direction when the sheave wheel is rotated in either direction, substantially as described.

2. Blast furnace charging apparatus comprising a rotary distributing hopper, means for rotating the hopper and mechanism for actuating the hopper rotating means, said means including an annular toothed rack and diametrically opposite ratchet pawls contacting with the toothed rack in turning said hopper; substantially as described.

3. Blast furnace charging apparatus comprising a rotary hopper, means for rotating the hopper and mechanism for actuating the hopper rotating means, said means including a cross head, having tilting ratchet pawls, and arranged to travel in a curved path; substantially as described.

4. In apparatus for charging blast furnaces, a gas sealing hood, a wheeled truck surrounding said hood and arranged to move transversely on the furnace with the hood, means for detachably securing the hood to the furnace top, and means removably mounted on the truck engaging with and supporting the hood while being moved transversely on the furnace top; substantially as described.

5. Apparatus for charging blast furnaces comprising top and bottom hoppers a gas sealing hood and a rotary hopper intermediate of said top and bottom hoppers and supported on said hood, the rotary hopper having an inclined bottom leading to a side outlet opening discharging into the bottom hopper; substantially as described.

6. Apparatus for charging blast furnaces comprising a bottom hopper having a closing bell, a gas sealing hood having a gas sealing bell, a rotary distributing hopper supported on said hood between said bells and means for rotating the distributing hopper and orienting successive charges of stock in the bottom hopper; substantially as described.

7. Apparatus for charging blast furnaces comprising a rotary distributing hopper, ratchet mechanism for rotating said hopper, a rocking arm operatively connected to said ratchet mechanism and means actuated by the skip car cables for rocking said arm and rotating said hopper; substantially as described.

8. In apparatus for charging blast furnaces having a rotary distributing hopper, means for rotating the hopper including a ratchet reciprocating in a path concentric with the vertical axis of the hopper and mechanism for actuating the hopper rotating means connected to and operated by the skip car cables for actuating the hopper turning mechanism; substantially as described.

9. In apparatus for charging blast furnaces, a gas sealing hood having a rotary hopper mounted therein, a toothed rack on said hopper, cross head slides on the hood, a cross head movable therein in a curved path having a ratchet pawl engaging with the rack to rotate the hopper, a swinging arm operatively connected to the skip car cables and an adjustable rod connecting said arm and cross head; substantially as described.

10. In apparatus for charging blast furnaces, a gas sealing hood having a rotary hopper mounted therein, a toothed rack on said hopper, cross head slides on the hood, cross heads movable therein in a curved path having a ratchet pawl engaging with the rack to rotate the hopper, a swinging arm operatively connected to the skip car cables, and a connecting rod universally movable, connecting said swinging arm and cross head; substantially as described.

In testimony whereof, I have hereunto set my hand.

FRANK H. CROCKARD.

Witnesses:
Wm. B. Dicks,
N. E. Cross.